(12) United States Patent
Stevens et al.

(10) Patent No.: US 6,353,663 B1
(45) Date of Patent: Mar. 5, 2002

(54) METHOD AND APPARATUS FOR SCREENING TELEPHONE CALLS

(75) Inventors: Gilman R. Stevens, Fairview; Babu Mani, Plano, both of TX (US)

(73) Assignee: Alcatel USA Sourcing, LP, Plano, TX (US)

(*) Notice: Subject to any disclaimer, the term of this patent is extended or adjusted under 35 U.S.C. 154(b) by 0 days.

(21) Appl. No.: 09/454,838

(22) Filed: Dec. 6, 1999

(51) Int. Cl.[7] .............................................. H04M 15/00
(52) U.S. Cl. ............. 379/114.22; 379/111; 379/114.01; 379/114.05; 379/114.21; 379/114.25; 455/405; 455/406
(58) Field of Search ........................... 379/111, 112.01, 379/114.01, 114.05, 114.06, 114.21, 114.22, 114.26, 114.28, 118, 120, 121.02, 127.03, 201.01, 207.02, 207.13, 221.08; 455/405, 406, 407, 408

(56) References Cited

U.S. PATENT DOCUMENTS

| | | | | |
|---|---|---|---|---|
| 5,027,387 A | * | 6/1991 | Moll | 379/112 |
| 5,381,467 A | * | 1/1995 | Rosinski et al. | 379/121 |
| 5,566,235 A | * | 10/1996 | Hetz | 379/201 |
| 5,579,379 A | * | 11/1996 | D'Amico et al. | 379/112 |
| 5,646,984 A | * | 7/1997 | Oda | 379/114 |
| 5,822,411 A | * | 10/1998 | Swale et al. | 379/111 |
| 5,835,573 A | * | 11/1998 | Dee et al. | 379/89 |
| 5,937,044 A | * | 8/1999 | Kim | 379/121 |
| 6,263,056 B1 | * | 7/2001 | Gruchala et al. | 379/114 |

* cited by examiner

Primary Examiner—Curtis Kuntz
Assistant Examiner—Quoc D. Tran
(74) Attorney, Agent, or Firm—Anderson, Levine & Lintel, LLP

(57) ABSTRACT

Callers to a number subscribing to a screening application are prompted that a fee will be charged for the connection to be completed. The prompting can occur at the initiation of the call, prior to any connection to the called party, or after the called party has had a chance to screen the call. The calling party can choose whether to complete the connection or to terminate the call. If the connection is completed, the fee is charged; otherwise, the call is terminated. Accordingly, most unwanted calls are avoided and users are compensated for receiving unwanted calls that are completed.

32 Claims, 4 Drawing Sheets

METHOD AND APPARATUS FOR SCREENING TELEPHONE CALLS

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to a method and apparatus for screening telephone calls.

2. Description of the Related Art

A continuing problem in telecommunications is the vast number of telemarketers and other unwanted callers who continuously invade the privacy of one's home or business. The reduced cost of telecommunications has made telemarketing a very cost effective advertising method. In addition to being very disturbing, many people find that telemarketers are much more likely to induce purchase of an unwanted service or good than are other forms of advertising.

Among the classes of people most likely to succumb to persistent telemarketers are the poor and elderly. Telemarketers are able to pinpoint the most susceptible segment of the population through purchased telephone lists. Often, these telemarketers are intentionally dishonest or misleading in identifying themselves and/or the nature of the good or service that they are selling. Since very few people record their calls, dishonest telemarketers can make misrepresentations without any evidentiary trail.

Some advancements in technology have improved a person's ability to screen calls. Caller ID allows a person to identify the calling party in some circumstances. However, it is possible for a calling party to block the caller ID information. In this case, a call will show up as "unknown name, unknown number." Since desirable parties may also show up as an "unknown name, unknown number", a receiving party must choose whether to accept a potentially undesirable call at the risk of missing a desirable call. Additionally, caller ID requires special circuitry and incurs a monthly fee from the telephone company.

Another form of screening calls is the use of an answering machine. A receiving party can listen to a message as it is being recorded, and answer the call if the caller is desirable. Many people are uncomfortable leaving messages, which results in some desirable calls being missed. Generally, only one answering machine is used per household, which requires the user to run to the machine when a call comes in. Further, answering machines are generally not practical in business situations (and many household situations); voice mail does not allow the user to intercept calls as the message is being recorded.

Accordingly, a need has arisen for an effective method and apparatus to screen calls.

BRIEF SUMMARY OF THE INVENTION

The present invention provides a method of screening calls, wherein an unauthorized calling party is prompted that a fee will be charged in order to establish a connection to the called party. Responsive to an action indicative of a rejection of the fee charge, the call is terminated. If the calling party indicates an acceptance of the fee charge, a connection is established and a charge is made to the calling party.

The present invention provides significant advantages over the prior art. Persons who knowingly making unwanted calls will generally disconnect the call in order to avoid paying the fee. If an undesirable caller, such as a telemarketer, chooses to complete the connection, at least the called party will be compensated for the inconvenience of answering the call. On the other hand, the called party can eliminate the charges to desirable parties, or can use a list of authorized callers to bypass the charging mechanism.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–6 of the drawings, like numerals being used for like elements of the various drawings.

Figure 1:
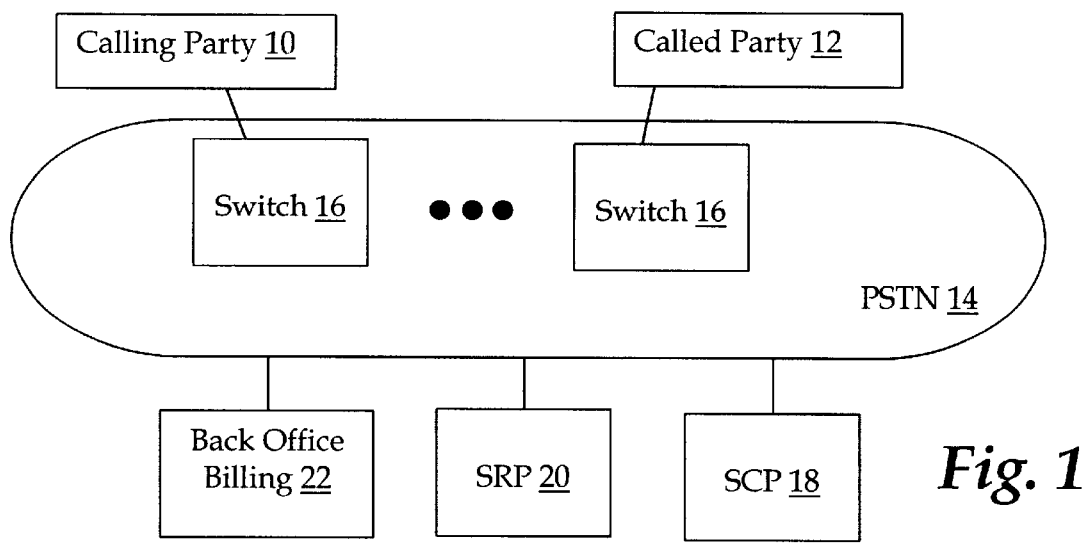
FIG. 1 illustrates a block diagram of a telecommunications switching system used in conjunction with a method for screening calls.

FIG. 1 illustrates a block diagram showing a preferred embodiment for implementing the present invention. A calling party 10 can contact a called party 12 through the PSTN (public switched telephone network) 14. For purposes of this application, the PSTN 14 includes publicly available switching systems, including cellular, satellite and other mobile phone switching systems, as well as wireline systems.

Calls through the PSTN 14 are routed through switches 16, which provide the connection between the calling party 10 and the called party 14. Using an AIN (Advanced Intelligent Network) architecture, service logic and intelligence is moved out of the switches (such as switches 16) and onto SCPs 18. SCPs communicate with switches using the CCS (common channel signaling) network. The switches 16 use TDPs (trigger detection points) to identify situations where formation of the connection is suspended in order to query an SCP 18. SRPs 20 (Service Resource Point) provide specific services to the AIN network, such as IVP (interactive voice prompting). A Back Office billing system 22 (hereinafter "billing system") receives information regarding charges to customers.

Figure 2:
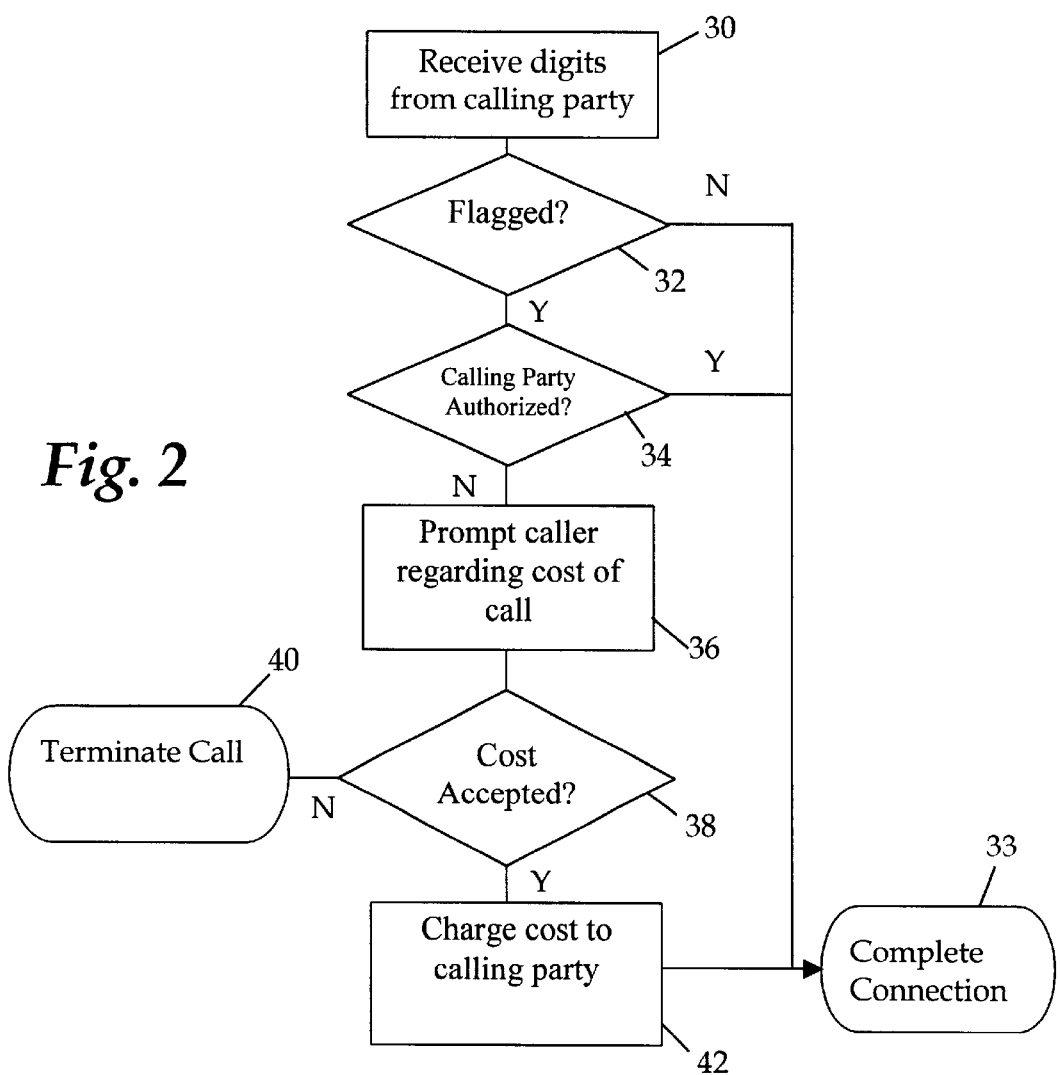
FIG. 2 illustrates a flow diagram of the basic operation of a preferred embodiment of a method for screening calls where callers may be assessed a charge to complete a connection.

The basic operation of the embodiment of FIG. 1 is shown in FIG. 2. In step 30, the calling party 10 initiates a call to the called party 12. The switch 16 associated with the calling party collects information regarding the number of the called party 12 (the "phone system number" or PSN) and the number of the calling party using Caller ID. If the called party subscribes to the call screening service of the present invention, the called party PSN will be flagged using the TDPs, causing the switch to query an SCP 16 on how to complete the call. In step 32, if the called party PSN is not flagged, i.e., the called party does not subscribe to the call screening service, the connection is completed as usual in step 33. On the other hand, if the call screening flag is set in step 32, the calling party PSN is compared to authorized numbers in a database (the "authorized caller" database) accessible by the SCP 16. For each subscriber, the authorized caller database lists PSNs that are authorized for connection to the called party. In step 34, if the calling party is an authorized caller, the SCP 18 sends the appropriate information to the switch 16 to complete the connection between the called party and the calling party in step 33. If the calling party is not an authorized caller, the calling party is audibly prompted with an explanation that a cost will be assessed to the account of the calling party in order to complete the connection. Typically, the prompting is performed using interactive voice prompting through the SRP 20. A typical prompt would be: "In order to complete this call, a fee of five dollars will be assessed to your account. If you accept this charge, press '1'. If you do not accept the charges, press '2' and the call will be terminated." Other inputs, such as voice recognition, could also be used to collect the calling party's response.

The calling party 12 then enters a response to the prompt of step 36. If the response indicates that the calling party declines to accept the charge in decision block 38, then the call is terminated in step 40. On the other hand, if the calling party indicates that the charge is accepted in decision block 38, then the SRP 20 sends an instruction (a CDR—call detail record) to back office billing 22 that a charge should be assessed to the calling party in step 42. If the calling party does not select either option, the prompt could be repeated. If the calling party does not respond after a second prompt, one of the two choices could be selected by default (if the default is to accept the charge, this should be indicated in the prompt). The charge could be credited entirely to the called party, or the charge could be split between the called party and the service provider. The SRP 20 then sends information to the switch 16 to complete the connection between the calling party and the called party in step 19.

While FIG. 2 illustrates a basic implementation of the preferred embodiment, many variations could be provided to accommodate circumstances that arise in normal usage of the telephone. One alternative would be to allow the calling party to use a PIN (personal identification number) for authorization. This could be used, in place of or in conjunction with the authorized caller list. The calling party could enter the PIN during or after the prompt to complete the connection without a fee charge. This would also allow authorized calls to be made from any phone.

Figure 3:
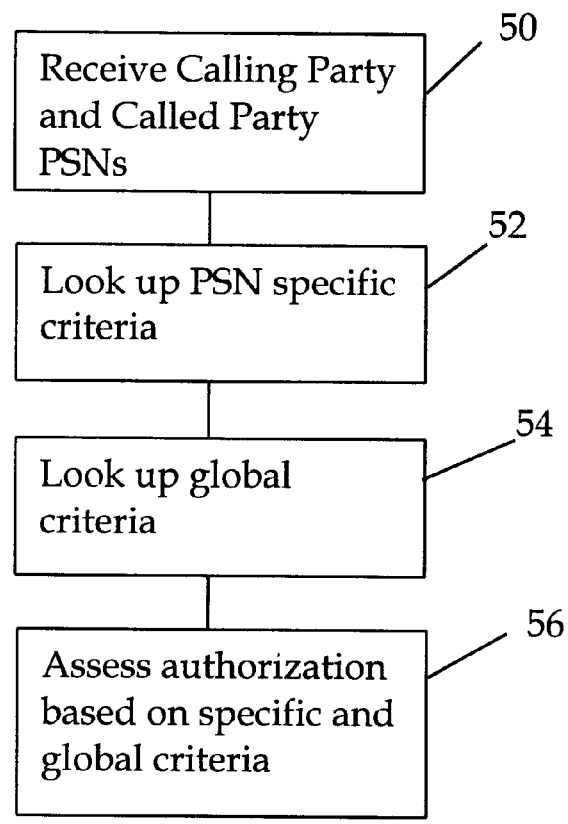
FIG. 3 illustrates a flow diagram of an embodiment for selecting authorized callers through evaluation of criteria.

FIG. 3 illustrates a flow diagram that provides for a more sophisticated method of determining whether a caller is authorized (step 34 of FIG. 2). In step 50, the SCP 18 receives the calling party PSN and called party PSN. Based on the called party PSN, the records concerning criteria chosen by the called party are accessed in the database maintained by the SCP 18. In step 52, PSN specific criteria are accessed. These criteria are specific to the calling party PSN. In step 54, global criteria are accessed. These criteria are applied generally to calls directed to the called party. In step 56, the criteria are evaluated to determine whether the call is authorized or not.

In operation, the specific criteria could concern many aspects that could be applied to a known caller. For example, one criterion could place a caller into one of three groups: (1) always connect (no charge), (2) never connect (terminate call without charging) and (3) charge (i.e., the called party is given the option to connect for a fee). More detailed criteria could provide more flexibility. The three groups described above could apply at different times of the day, or different days of the week. A caller could be in the "always connect" group during certain hours of the day, for example from 10:00 AM to 9:00 PM, in the "charge" category from 8:00 AM to 10:00 AM and from 9:00 PM to 11:00 PM, and in the "never connect" category from 11:00 PM to 8:00 AM. This would be useful for families with teenage children to reduce or eliminate calls during certain hours. Using a PIN authorization, different PINs could be assigned for different levels of authorization.

Global criteria could be used to categorize calls without referring to a specific number. In a first example, a person who has moved to a new city may wish to authorize all calls from his or her hometown. In this case, all calls with a certain area code could be designated as "always connect" (in general, a specific criteria for a PSN with that area code would override the global designation). In this way, the called party would not need to list everyone from that city as an authorized caller, when there is little chance that a telemarketer from that area code would call. Another example would be to authorize (or group as "never connect") a block of telephone numbers that would be associated with a common source. For example, if a school has blocks of numbers from 214-555-0100 to 214-555-0200, this block could be authorized to ensure that calls from school were not blocked.

Day and time criteria could also be used globally. For example, all calls from 11 PM to 7 AM could be blocked, unless the number was specifically authorized.

Further, it would be possible to have additional groups in which to categorize callers. For example, the "charge" group could be expanded into "charge $2" and "charge $10" groups. This would provide for a higher fee for more intrusive calls (e.g., those occurring after 11 PM).

For most people, it would be impossible to authorize all desirable callers. Also, an authorized caller may need to contact the called party from a phone that is not in the database (or is in the database as a "charge" or "never connect" entry). As a result, desirable calls could be missed. The flow chart of FIG. 4 illustrates the steps that can be used to accommodate calls these situations.

Figure 4:
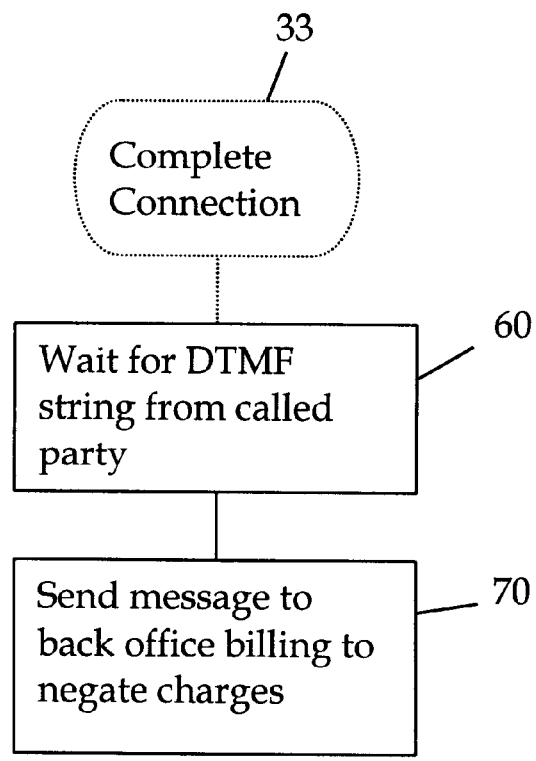
FIG. 4 illustrates a flow diagram for negating charges for a desirable call.

In FIG. 4, after the connection has been completed in step 33 (see FIG. 2), the user has the opportunity to cancel the charges. In step 60, the SRP 20 is waiting to detect a certain string of DTMF (dual tone modulated frequency) tones from the called party's phone, such as "*77". Detection of a DTMF tone string is well known in the art and is currently used for a number of services, such as three-way calling. Upon receiving a specific DTMF tone string, the SRP 20 would send a CDR to the back office billing, negating the charges (step 62).

In operation, the embodiment shown in FIG. 4 would allow a caller to take a chance that the called party, assuming the call was legitimate, would reverse the call charges. In this scenario, the prompt issued by the SRP 20 may be slightly different, such as "You should know that the called party has set a price of X dollars .for this call if you decide to connect, and clearing the charges is solely subject to the discretion of the called party. Press "1" to connect or "2" to disconnect." Where a more detailed criterion is used, the prompt could be more specific, such as "You should know that the called party set a price of X dollars for all calls between 11 PM and 8 AM. If you decide to connect, clearing the charges is solely subject to the discretion of the called party. Press '1' to connect or '2' to disconnect."

Figure 5:
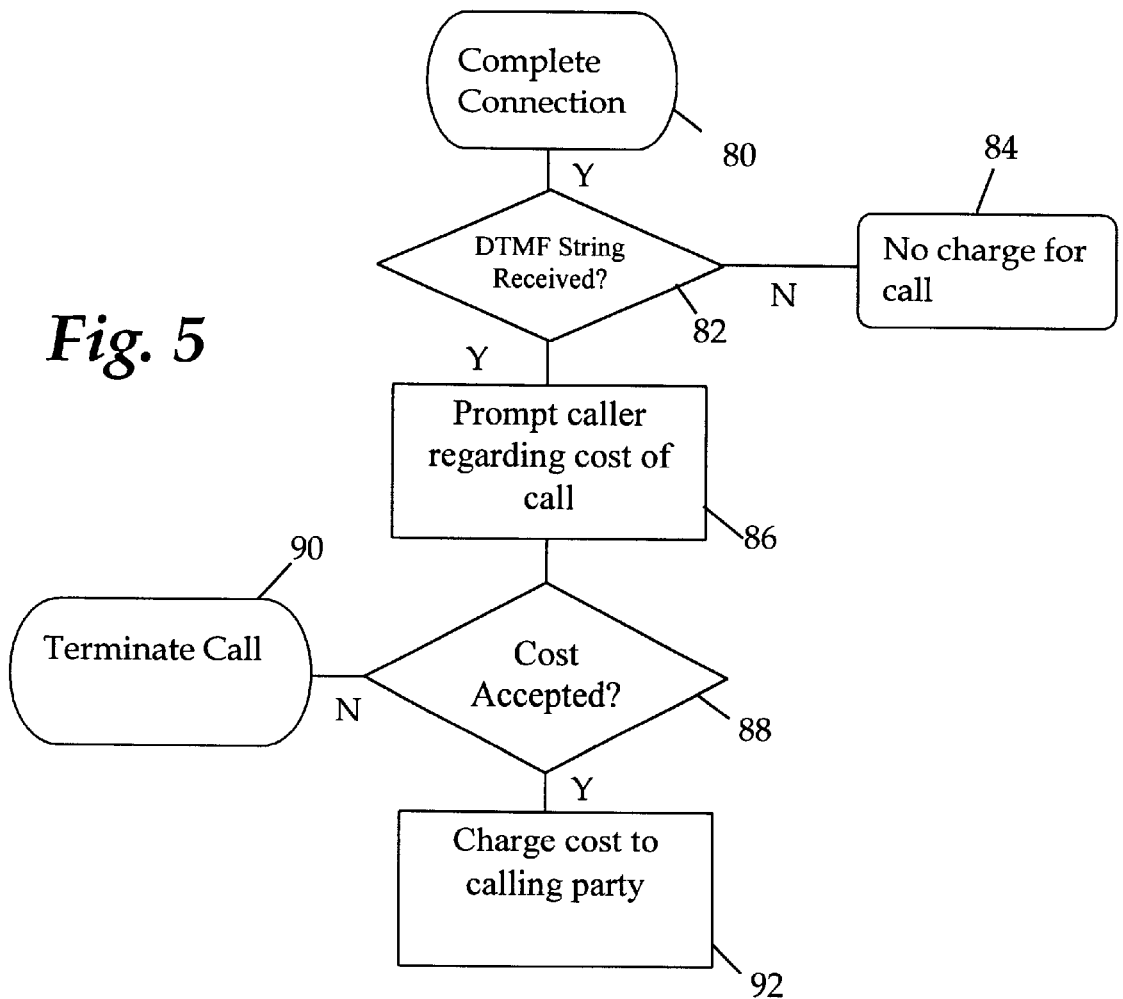
FIG. 5 illustrates a flow diagram of an alternative embodiment of the invention where a called party can prompt a user for charges after an initial connection is completed.

FIG. 5 illustrates an alternative embodiment where an initial connection is made between the calling party and the called party and, upon learning of the caller's identity, the called party has the option to invoke charges if the calling party wishes to continue the call.

In step 80, a connection is made between the calling party and the called party using normal techniques. Upon answering the call, the normal exchange of greetings will ensue. At any time during the call, the called party may invoke charge prompt by pressing a predetermined string of keys, for example, "*78". An additional digit may be used to indicate the charge (for example, *780=no charge, *781=$1 charge, *789=$9 charge). If, during the call, the string is not detected in decision block 82, then no charge is assessed for the call (step 84). On the other hand, if the string is detected in decision block 82, the SRP issues a prompt to the called party in step 86, explaining that to continue the call, a certain fee will be charged. The caller may accept or decline the charge in step 88. If declined, the call is terminated in step 90. If accepted, the charge is assessed to the caller via the back office billing 22 and the caller is reconnected to the called party in step 92. Alternatively, the called party could be prompted at the end of a call to enter a digit representing the amount that the calling party would be charged–"0"=no charge; "9"=$9 charge, for example.

This embodiment of the invention allows the called party to determine the identity of the user prior to prompting for a charge and provides a positive charge indication from the called party.

Figure 6:
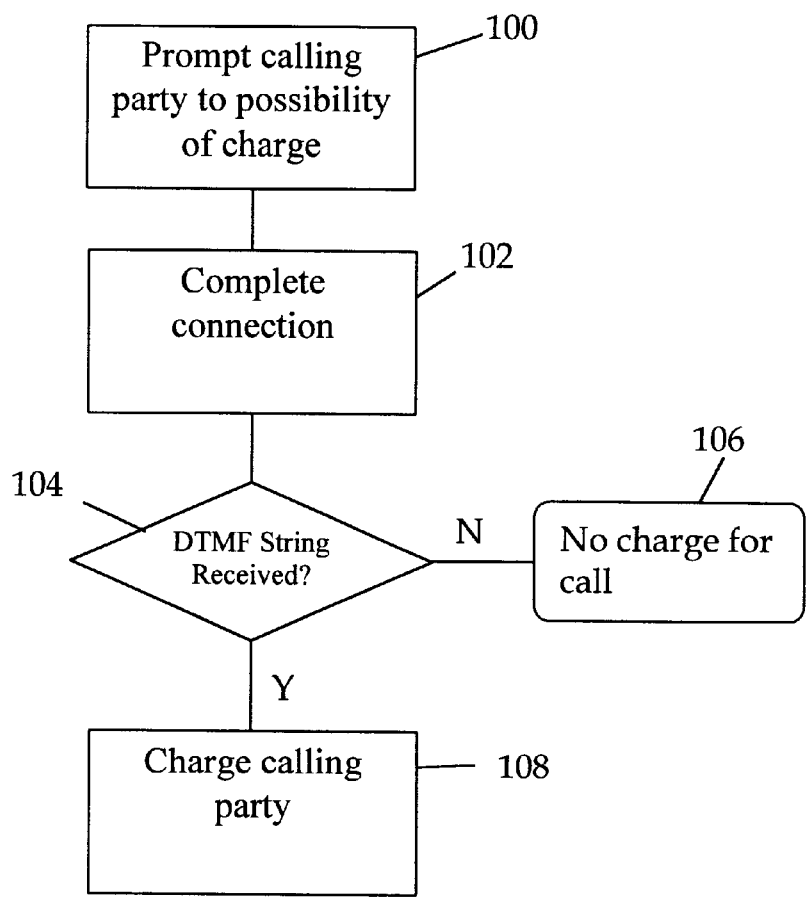
FIG. 6 illustrates a flow diagram of an alternative embodiment of the invention where a called party can assess charges after a connection is completed without further prompting.

FIG. 6 illustrates a third embodiment of the invention, where, upon initiating a call, the caller is prompted with a notification that the called party has reserved the right to charge a certain fee to a caller (step 100). The calling party can disconnect at this time, or continue with the call (alternatively, the calling party would be forced to continue or terminate using the DTMF tones). If the caller does not terminate, the connection is completed in step 102. At any time during the call, or immediately thereafter, the called party can enter a DTMF string indicating that the charge should be assessed. If the string is not detected in decision block 104, no charge is assessed in step 106. If the string is detected, then the charge is assessed in step 108. Again, the string could provide for a variable charge rate to be determined by the called party.

The present invention provides significant advantages over the prior art. First, the called party, in most cases, will not have to screen calls for their importance, since the callers will screen themselves. Callers who know that their calls will be annoying, such as telemarketers, will most often not want to pay a fee, especially where the mere existence of the invention is indicative that the called party is not receptive to intrusive calls. Unimportant calls during inconvenient times (i.e., during times when the charge feature is activated for the caller or in a global criterion) will also generally be terminated. Important calls will be placed, with the understanding that the charges will be cancelled or because the call is of sufficient importance that the fee is acceptable.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of screening calls, comprising the steps of:
   prompting a calling party that a fee will be charged for a connection to be established with a called party;
   terminating the call responsive to an action indicative of an rejection of the fee charge;
   charging a fee to the calling party and establishing a connection responsive to an action indicative of an acceptance of the fee charge; and
   paying at least a portion of said fee to the called party.

2. The method of claim 1 and further comprising the step of determining whether a party is authorized and connecting the calling party to the called party if the calling party is an authorized caller.

3. The method of claim 2 and wherein said determining step comprises the step of searching a database of authorized callers associated with the called party.

4. The method of claim 3 and further comprising the step of identifying a calling party using Caller ID, wherein said database is searched responsive to said identifying step.

5. The method of claim 2 wherein said determining step comprises the step of receiving a identification number from the calling party.

6. The method of claim 1 and further comprising the step of allowing the called party to eliminate the fee after the connection is made.

7. The method of claim 6 wherein said step of allowing the called party to eliminate the fee comprises the step of allowing the called party to enter a code using a telephone keypad to eliminate the fee after the connection is made.

8. The method of claim 1 wherein said prompting step is made in response to a predetermined signal by said called party after an initial connection is made between the called party and calling party.

9. The method of claim 8 wherein said prompting step is made in response to a predetermined input on a telephone keypad by said called party.

10. The method of claim 1 wherein said prompting step is made in response to a receiving a destination number by the calling party.

11. The method of claim 1 wherein the prompting step occurs prior to a step of establishing a connection with the called party.

12. The method of claim 11 wherein the user initiates said charging step after the identity of the caller is established.

13. The method of claim 1 wherein the prompting step occurs subsequent to a step of establishing a connection with the called party.

14. The method of claim 1 and further comprising the steps of identifying the calling party as associated with one of a plurality of groups and wherein said fee is dependent upon said associated group.

15. The method of claim 14 wherein said fee is dependent upon said associated group and time-of-day criteria.

16. The method of claim 14 wherein said one or more of said groups correspond to respective blocks of numbers.

17. Circuitry for screening calls, comprising:
   circuitry for prompting a calling party that a fee will be charged for a connection to be established with a called party;

circuitry for terminating the call responsive to an action indicative of an rejection of the fee charge;

circuitry for charging a fee to the calling party and establishing a connection responsive to an action indicative of an acceptance of the fee charge; and circuitry for paying at least a portion of said fee to the called party.

18. The call screening circuitry of claim 17 and further comprising circuitry for identifying an authorized calling party.

19. The call screening circuitry of claim 18 and wherein said identifying circuitry comprises circuitry for searching a database of authorized callers associated with the called party and connecting the calling party to the called party if the calling party is an authorized caller.

20. The call screening circuitry of claim 19 wherein said identifying circuitry comprises circuitry for identifying a calling party using Caller ID, and searching said database responsive thereto.

21. The call screening circuitry of claim 18 wherein said identifying circuitry comprises circuitry for receiving a personal identifier from the calling party.

22. The call screening circuitry of claim 17 and further comprising circuitry for allowing the called party to eliminate the fee after the connection is made.

23. The call screening circuitry of claim 21 wherein circuitry for allowing the called party to eliminate the fee comprises circuitry for allowing the called party to enter a code using a telephone keypad to eliminate the fee after the connection is made.

24. The call screening circuitry of claim 17 wherein said prompting circuitry prompts the calling party in response to a predetermined signal by said called party after an initial connection is made between the called party and calling party.

25. The call screening circuitry of claim 24 wherein said prompting circuitry prompts the calling party in response to a predetermined input on a telephone keypad by said called party.

26. The call screening circuitry of claim 17 wherein said prompting circuitry prompts the calling party in response to a receiving a destination number by the calling party.

27. The call screening circuitry of claim 17 wherein the prompting circuitry prompts the calling party prior to establishing a connection with the called party.

28. The call screening circuitry of claim 27 wherein the charging circuitry allows the called party to initiate the fee charge after the identity of the caller is established.

29. The call screening circuitry of claim 17 wherein the prompting circuitry prompts the calling party subsequent to of establishing a connection with the called party.

30. The method of claim 17 and further comprising the steps of identifying the calling party as associated with one of a plurality of groups and wherein said fee is dependent upon said associated group.

31. The method of claim 30 wherein said fee is dependent upon said associated group and time-of-day criteria.

32. The method of claim 31 wherein said one or more of said groups correspond to respective blocks of numbers.

* * * * *